No. 803,851. PATENTED NOV. 7, 1905.
E. PYLE.
FEED BAG.
APPLICATION FILED JUNE 23, 1904.
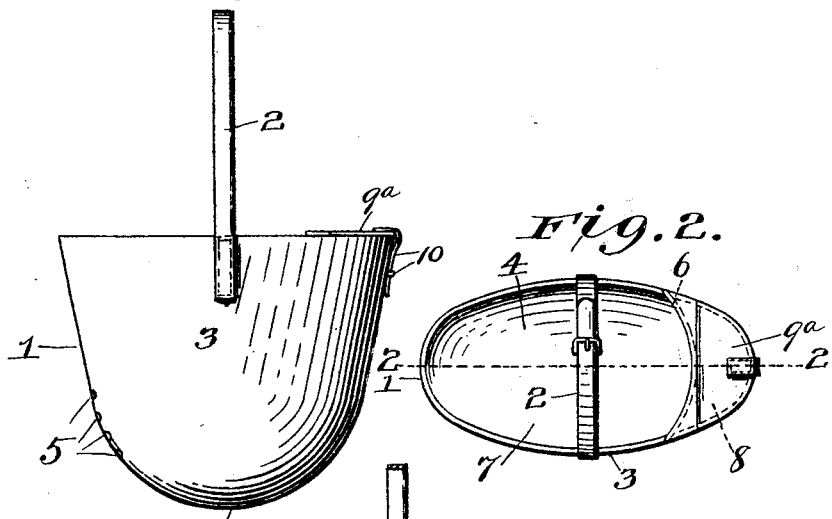
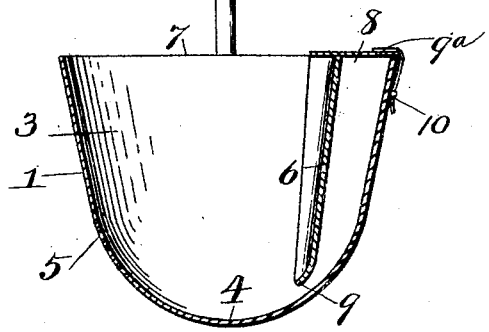
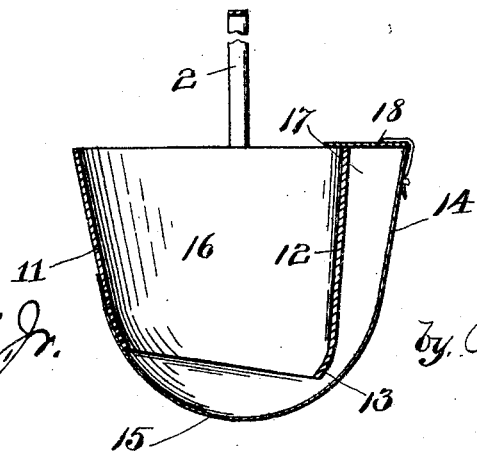
Inventor
Edward Pyle
by Blackwood Bros.
his Attorneys

UNITED STATES PATENT OFFICE.

EDWARD PYLE, OF LINCOLN, NEBRASKA.

FEED-BAG.

No. 803,851. Specification of Letters Patent. Patented Nov. 7, 1905.

Application filed June 23, 1904. Serial No. 213,786.

*To all whom it may concern:*

Be it known that I, EDWARD PYLE, a citizen of the United States, residing at Lincoln, in the county of Lancaster and State of Nebraska, have invented certain new and useful Improvements in Feed-Bags, of which the following is a specification.

My invention relates to an improvement in feed-bags designed for use in feeding horses and other animals.

A horse or other animal while feeding from a feed-bag of the ordinary construction where the feed is all in one compartment slabbers the feed, eats too greedily, and also frequently tosses his head about or throws it up in order to get the feed therein, and in so doing more or less of the feed necessarily escapes from the mouth of the bag, and where the feed is very expensive or even when it is not such waste amounts to quite an item of expense.

My invention has for its object, therefore, to overcome such disadvantages by providing a simple and effective feed-bag which will enable a horse or other animal to readily feed therefrom and at the same time effectively prevent the slabbering of the feed and any waste of the feed from the bag.

It still further has for its object to provide a feed-bag which possesses advantages in point of inexpensiveness, durability, and general utility.

In the drawings, Figure 1 is a side elevation; Fig. 2, a top plan; Fig. 3, a central vertical section on the line 2 2 of Fig. 2; Fig. 4, a central vertical section of a modified form of a feed-bag.

Corresponding parts in all the figures are denoted by the same reference characters.

Referring to the drawings, 1 represents the feed-bag, which may be made of leather, canvas, or any other suitable material and designed to fit comfortably over the nose of a horse or other animal and be held thereon by being suspended from the neck of the animal by the usual strap or rope 2.

3 is the body portion of the feed-bag, and 4 the bottom thereof, said bottom being curved downwardly from the sides of the feed-bag for the purpose of directing the feed from the sides of the feed bag to the center of said bottom, where it is more convenient for the animal to reach it.

5 represents holes in the front wall of the body portion for the purpose of admitting air to the interior of the feed-bag and enabling the animal to breathe freely while feeding.

6 is a vertical partition which extends across and divides the feed-bag into two compartments 7 and 8, said partition having its lower end curved inwardly, as at 9.

The compartment 7 is the feed-chamber proper, and the compartment 8 is the feed containing and distributing hopper, which automatically keeps the feed-chamber supplied with feed as fast as it is consumed by the animal, but only allows a limited quantity at a time to be supplied thereto.

9ª is a pivoted or hinged cover for the feed-hopper, which is designed to be held closed by means of a strap and buckle 10.

In the modified form of feed-bag shown in Fig. 4 the body 11 is preferably made of leather, stiff canvas, or other suitable material which is rigid or stiff enough for the purpose, and the lower end of the rear wall 12 of said body portion 11 is curved inward, as at 13. The rear end 14 and the bottom 15 of the feed-bag are made of flexible canvas, rubber cloth, or other suitable flexible material. The space 16 of the body portion 11 constitutes the feed-chamber and the space between the rear wall 12 of the body portion and the rear end 14 of the feed-bag constitutes the feed containing and automatic distributing hopper 17, which is provided with a hinged cover 18. By having the rear end and bottom of the feed-bag made, as shown in the modified form, Fig. 4, of flexible material when the animal's nose comes in contact with the flexible bottom of the feed-bag it will move said bottom, which will impart motion to the flexible rear end of the feed-bag, and thereby agitate, shake, and deliver the feed to the feed-chamber and prevent any clogging of the feed in the hopper.

In use the hopper is filled with feed, the cover closed and secured, then the nose of the animal is inserted into the feed-chamber, and the strap, rope, or other device for suspending the bag is thrown over the neck of the animal and secured, when the feed-bag is ready for use.

I do not desire to be understood as limiting myself to the specific details of construction and arrangement as herein described and illustrated, as it is manifest that variations and modifications may be made in the features of construction and arrangement in the adaptation of the device to the various conditions of use without departing from the spirit of my invention and improvements. I therefore reserve the right to all such variations and modifications as properly fall within the scope of my invention and the terms of the following claims.

I claim—

1. A feed-bag comprising a bottom and front and rear walls, the rear wall curved horizontally in cross-section and its lower end curved inwardly and downwardly toward the bottom of the feed-bag, and said rear wall having its lateral edges attached from top to bottom to the feed-bag, and a hopper having a rear wall integral with the bottom of said feed-bag, substantially as described.

2. A feed-bag provided with a rear wall, a flexible bottom, a hopper with a flexible rear wall integral with said bottom, substantially as described.

3. A feed-bag provided with a bottom of flexible material, a hopper with a flexible wall and a body portion of rigid material, substantially as described.

4. A feed-bag provided with a flexible bottom, a body portion of rigid material having apertures in its front wall, and its rear wall curved inwardly at the lower end, and a flexible hopper substantially as described.

5. A feed-bag provided with a feed-chamber, a hopper having a flexible rear wall, designed to be moved to accelerate the delivery of feed to the feed-chamber, substantially as described.

6. A feed-bag provided with a hopper, a flexible bottom connected to said hopper, designed to be pressed upon and accelerate the delivery of feed from said hopper, substantially as described.

In testimony whereof I have signed my name to this specification in the presence of two subscribing witnesses.

EDWARD PYLE.

Witnesses:
JOS. H. BLACKWOOD,
WM. L. TYDINGS.